Apr. 24, 1923.
W. F. RIDGE
STEERING WHEEL COVER
Filed Oct. 23, 1922
1,453,181
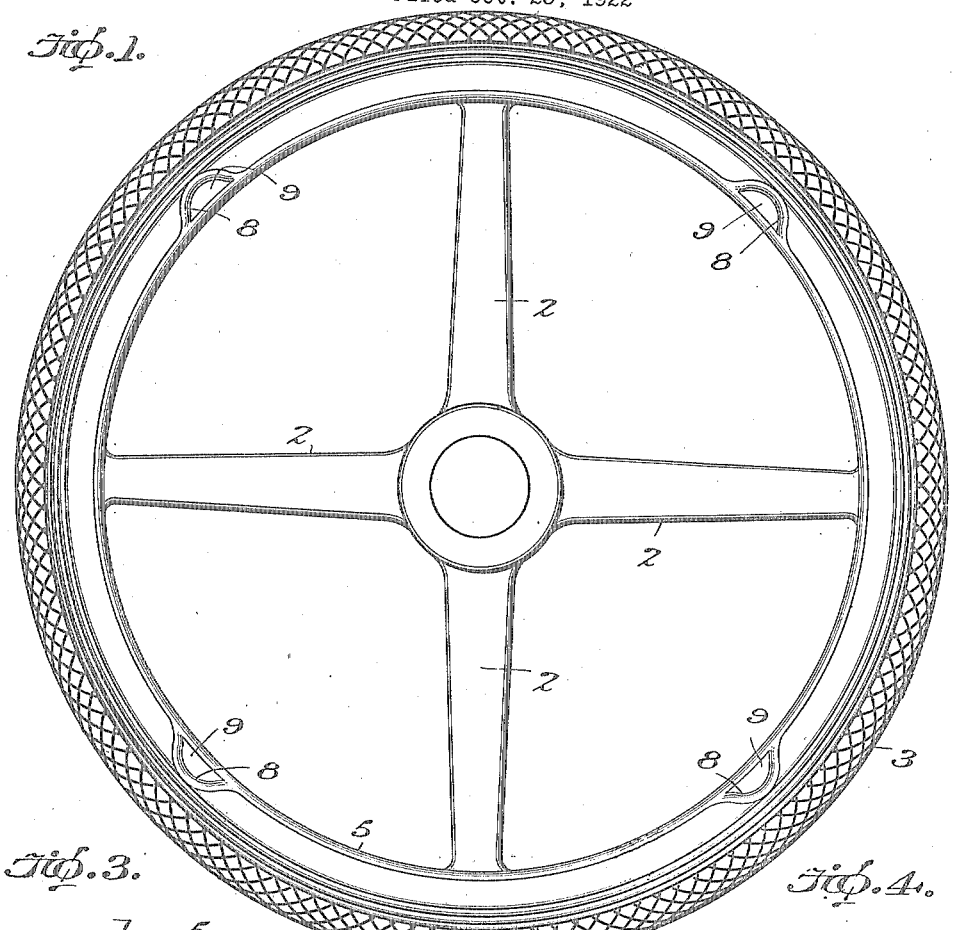
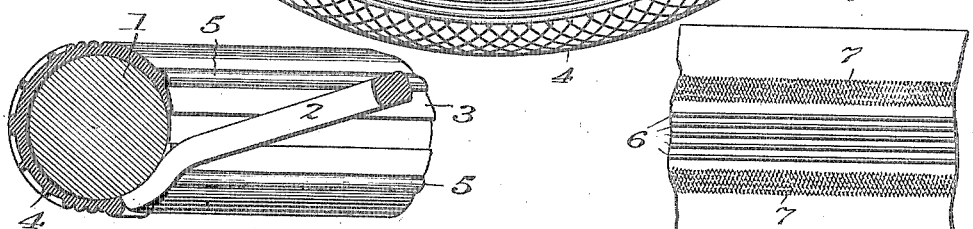
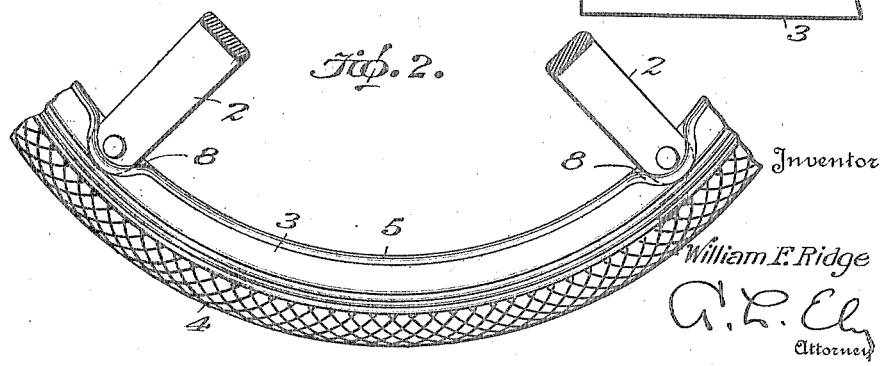
Inventor
William F. Ridge
Attorney Patented Apr. 24, 1923.

1,453,181

UNITED STATES PATENT OFFICE.

WILLIAM F. RIDGE, OF AKRON, OHIO.

STEERING-WHEEL COVER.

Application filed October 23, 1922. Serial No. 596,210.

*To all whom it may concern:*

Be it known that I, WILLIAM F. RIDGE, a citizen of the United States, and a resident of Akron, county of Summit, State of Ohio, have invented certain new and useful Improvements in Steering-Wheel Covers, of which the following is a specification.

This invention has for its object the provision of an elastic sheath or cover for use upon steering wheels of automobiles, although it may be capable of other and more extended uses. The specific object of my invention is to improve upon the construction of steering wheel covers such as shown in my prior Patent No. 1,446,628, dated February 27, 1923, it being the purpose to improve certain features of the prior construction as will be more particularly pointed out in the claims appended hereto.

In the drawings is shown one embodiment of the invention, it being obvious that modifications and changes may be made therein without departing from the essential features of the invention.

In the drawings:

Figure 1 is a plan view of a steering wheel with the cover in place, showing the invention as applied to one type of wheel;

Figure 2 is a fragmentary plan showing the manner in which the cover may be adapted to another type of wheeel;

Figure 3 is a section through a wheel of the type shown in Figure 2; and

Figure 4 is a view of the inner surface of the cover.

In the drawings, 1 represents the rim or periphery of a steering wheel in which 2 are the spokes. The cover is indicated by the numeral 3 and is formed as a continuous rubber sheath or jacket open at its inner periphery so that it may be slipped into position over the wheel. The cover is so constructed that it will fit snugly over the wheel and does not require any fastening devices as it is made smaller than the wheel so that it will contract into place on the wheel and be held in position by the contraction of the cover. The cover may be made slightly thicker about the region of its outer periphery and is preferably provided with a roughened or corrugated outer surface 4, so as to improve the grip obtained by the driver upon the steering wheel.

In order to cause the cover to cling about the transverse curvature of the steering wheel, it is transversely curved and its edges about the slit may be beaded or thickened, as at 5, so that upon contraction of the sheath the edges will be drawn in about the wheel.

On its inner surface the rubber cover or sheath may be provided with any suitable roughened or corrugated surface which will increase the grip of the cover on the wheel and prevent either circumferential or transverse shifting of the cover. Such a construction is illustrated in Figure 4, which shows the inner surface of the cover. While the irregularities in the surface may take any suitable form, I have shown a plurality of circumferential ribs or beadings 6 and knurled or net-like surfaces 7 on either side of the ribs. This roughening of the inner surface may, it is obvious, assume any form, that shown being merely an example of a satisfactory form of device for the purpose.

Steering wheels are of two distinct types with respect to one object of this invention. In one type of wheel the spokes converge to the center of the wheel from the innermost periphery. In another type the spokes are attached to the upper or lower surface of the rim. In my former application the type of cover shown therein was suitable for the former type of wheel, and when applied to the latter type was unsuitable, as the edge of the cover would bridge over the spokes. The cover shown in this application is suitable for either type of wheel. The spokes of the former type of wheel are shown in Figure 1, while the spokes of the latter type are shown in Figures 2 and 3.

In order to make the cover suitable for either type, the outer beading 5 is provided at points adapted to register with the spokes of the wheel with reentrant or outcurving portions 8, so that there are provided small, substantially semi-circular areas 9 enclosed by the outer bead 5 and the reentrant portion 8. It is apparent that the shape of these areas is not essentially as shown, and that, ordinarily, they need be provided on one side of the cover only.

When the cover is to be applied to a steering wheel of the type shown in Figure 1, the areas 9 are allowed to remain in the edges of the cover, but when it is applied to a wheel of the type shown in Figures 2 and 3, the areas 9 are cut out, which leaves a cover provided with a continuous bead having at intervals, registering with the underslung or overhung spokes, the reentrant portions 8, in order to fit this type of wheel snugly.

It will be observed that I have provided the continuous elastic torus of my prior application with additional means to prevent slippage of the cover relative to the wheel, and have also so constructed the device that it will fit both types of steering wheels, by a slight alteration which does not affect the operativeness of the device in any way. The principles of the construction may be embodied in different form, these features being maintained.

What I claim is:

1. As a new article of manufacture, an elastic cover for steering wheels or the like, comprising a torus split along its inner circumference and provided on its surface in contact with the wheel with irregular formations adapted to prevent slippage of the cover.

2. As a new article of manufacture, an elastic cover for steering wheels or the like, comprising a ring of elastic material throughout having a transverse curvature adapted to fit around the rim of the wheel and roughened on the inner surface of the cover to prevent slipping of the cover over the rim of the wheel.

3. As a new article of manufacture, a cover for steering wheels, comprising an elastic torus having a slit on its inner circumference and a roughened inner surface in contact with the rim of the wheel.

4. As a new article of manufacture, a cover for steering wheels, comprising an elastic sheath adapted to fit over the wheel, beads about the edges of the sheath, and outwardly curved portions on the beads arranged to register with the spokes of the wheel.

5. As a new article of manufacture, a cover for steering wheels, comprising an elastic sheath having a transverse curvature adapted to fit over the wheel, beads about the edges of the sheath, and outwardly curved portions on one of said beads adapted to register with the spokes of the wheel.

6. As a new article of manufacture, a cover for steering wheels, comprising an elastic sheath having a transverse curvature adapted to fit over the wheel, a continuous circumferential bead on one edge of the sheath, and a second bead on the other edge of the sheath interrupted at intervals by reentrant portions adapted to register with the spokes of the wheel.

7. As a new article of manufacture, a cover for steering wheels, comprising a continuous elastic sheath slit at its inner edge to fit over a steering wheel, and recesses about the edge of the sheath to register with the spokes of the wheel.

8. As a new article of manufacture, a cover for steering wheels, comprising a continuous elastic sheath slit at its inner circumference to fit over a steering wheel, said sheath being curved transversely and provided along the edges of the slit with enlarged beads and secondary curved portions on a bead adapted to register with the spokes of a steering wheel.

9. As a new article of manufacture, a cover for steering wheels, comprising a continuous elastic sheath slit along its inner edge and transversely curved to fit over the rim of a steering wheel, recesses about an inner edge of the sheath, and means about the edge of the sheath adapted to cause it to cling to the surface of the wheel.

WILLIAM F. RIDGE.